(12) United States Patent
Han et al.

(10) Patent No.: US 9,823,519 B2
(45) Date of Patent: Nov. 21, 2017

(54) LIQUID CRYSTAL DISPLAY AND METHOD FOR MANUFACTURING THE SAME

(71) Applicant: Shenzhen China Star Optoelectronics Technology Co., Ltd., Shenzhen, Guangdong (CN)

(72) Inventors: Bing Han, Guangdong (CN); Zuomin Liao, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/417,623

(22) PCT Filed: Jan. 19, 2015

(86) PCT No.: PCT/CN2015/071014
§ 371 (c)(1),
(2) Date: May 4, 2016

(87) PCT Pub. No.: WO2016/095310
PCT Pub. Date: Jun. 23, 2016

(65) Prior Publication Data
US 2016/0246098 A1    Aug. 25, 2016

(30) Foreign Application Priority Data
Dec. 18, 2014  (CN) .......................... 2014 1 0802610

(51) Int. Cl.
G02F 1/1339   (2006.01)
G02F 1/1335   (2006.01)
G02F 1/1333   (2006.01)

(52) U.S. Cl.
CPC .... *G02F 1/13394* (2013.01); *G02F 1/133514* (2013.01); *G02F 2001/13398* (2013.01); *G02F 2001/133354* (2013.01)

(58) Field of Classification Search
None
See application file for complete search history.

(56) References Cited

U.S. PATENT DOCUMENTS

2005/0146669 A1   7/2005   Yeh
2005/0264749 A1   12/2005  Lee
(Continued)

FOREIGN PATENT DOCUMENTS

CN   101377592 A   3/2009
CN   101762916 A   6/2010
(Continued)

*Primary Examiner* — Ashok Patel

(57) ABSTRACT

A liquid crystal display and a method for manufacturing the liquid crystal display are provided. The liquid crystal display comprises a first substrate and a second substrate that are spaced apart from each other, and spacers disposed between the first substrate and the second substrate and in contact with the first substrate and the second substrate. Elevating layers are disposed on the second substrate and in contact with the spacers, and each of the elevating layers is structured with a cross section including a laterally extending portion and a longitudinally extending portion. According to the present disclosure, the problem of moving mura of the liquid crystal display can be significantly alleviated.

5 Claims, 4 Drawing Sheets

(56) References Cited

U.S. PATENT DOCUMENTS

| | | | | |
|---|---|---|---|---|
| 2008/0291385 A1* | 11/2008 | Aizawa | ............... | G02F 1/13394 349/157 |
| 2012/0314163 A1* | 12/2012 | Joo | ..................... | G02F 1/13394 349/106 |
| 2016/0062171 A1* | 3/2016 | Um | ..................... | G02F 1/13394 349/43 |

FOREIGN PATENT DOCUMENTS

| | | |
|---|---|---|
| CN | 102243400 A | 11/2011 |
| CN | 103149747 A | 6/2013 |

* cited by examiner

LIQUID CRYSTAL DISPLAY AND METHOD FOR MANUFACTURING THE SAME

CROSS REFERENCE TO RELATED APPLICATION

The present application claims benefit of Chinese patent application CN 201410802610.3, entitled "A Liquid Crystal Display and A Method for Manufacturing the Same" and filed on Dec. 18, 2014, which is incorporated herein by reference on its entirety.

TECHNICAL FIELD

The present disclosure relates to a liquid crystal display and a method for manufacturing the liquid crystal display, and in particular to a liquid crystal display including spacers being securely arranged and a method for manufacturing the liquid crystal display.

TECHNICAL BACKGROUND

In recent years, as photoelectric technology develops rapidly, liquid crystal displays (LCDs) with small size, light weight, and good display effect are becoming more and more favored by consumers.

Figure 1:
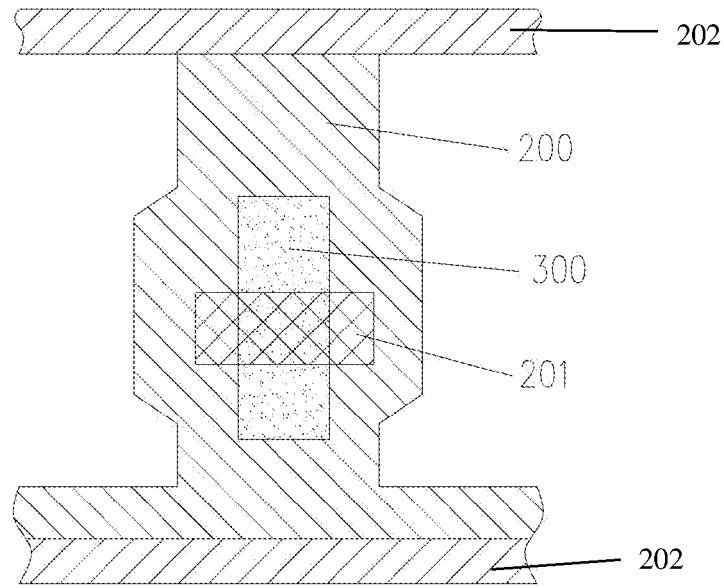
Figure 2:
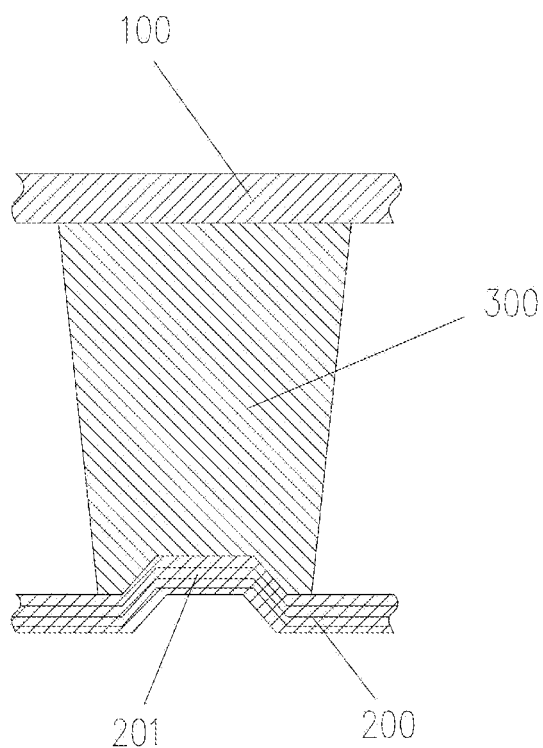

The liquid crystal display comprises a color filter substrate and an array substrate, with liquid crystal material filled therebetween for display. In addition, spacers are disposed between the color filter substrate and the array substrate, so that a space can be kept therebetween. FIGS. 1 and 2 schematically show a color filter substrate 100, an array substrate 200, and a spacer 300 disposed between the color filter substrate 100 and the array substrate 200 in a liquid crystal display in the prior art. A rectangular elevating layer 201 is disposed on the array substrate 200, and the spacer 300 is disposed on the elevating layer 201 and in contact with the color filter substrate 100. Reference number 202 indicates a gate line in the array substrate 200.

When the liquid crystal display is impacted, e.g. when the screen thereof is hit, as schematically shown in FIG. 2, displacement between the color filter substrate 100 and the array substrate 200 might occur, and thus the spacer 300 might misplace and go outside the elevating layer 201 due to the limitation by the short sides thereof. In this case, the initial position of the spacer 300 will be difficult to resume. Under such circumstances, moving mura would occur to the liquid crystal display, i.e., partial region on the liquid crystal display would brighten up, without the possibility of being restored to normal state. Consequently, the display effect of the liquid crystal display will be severely influenced, the display quality thereof will be reduced, and the yield of liquid crystal display will be influenced.

SUMMARY OF THE INVENTION

In order to solve the abovementioned technical problem, the present disclosure provides a liquid crystal display, which can greatly reduce the phenomenon of moving mura. The present disclosure further relates to a method for manufacturing the liquid crystal display.

1) According to a first aspect of the present disclosure, a liquid crystal display is provided, comprising a first substrate and a second substrate that are spaced apart from each other, and spacers disposed between the first substrate and the second substrate and in contact with the first substrate and the second substrate, wherein elevating layers are disposed on the second substrate and in contact with the spacers, and each elevating layer is structured with a cross section including a laterally extending portion and a longitudinally extending portion.

In the liquid crystal display according to the present disclosure, because each elevating layer has a laterally extending portion and a longitudinally extending portion, a corresponding spacer will still be kept on the elevating layer when displacement between the first substrate and the second substrate occurs, thereby the problem of moving mura on the liquid crystal display can be avoided. As a result, the display effect of the liquid crystal display can be improved and the yield thereof can be increased.

2) In an embodiment according to 1) of the present disclosure, the elevating layers each have a cross-shaped cross section. The simplest method for the elevating layer to have a laterally extending portion and a longitudinally extending portion is to provide the elevating layer with a cross-shaped cross section. In this case, the production cost of the liquid crystal display can be reduced.

3) In an embodiment according to 1) or 2) of the present disclosure, the spacers each are in contact with both the laterally extending portion and the longitudinally extending portion of the cross section of a corresponding elevating layer. The stability of the spacers arranged in such manner can be significantly improved, thereby the probability of moving mura on the liquid crystal display can be further reduced.

4) In an embodiment according to one of 1) to 3) of the present disclosure, the laterally extending portion and the longitudinally extending portion of the cross section of each of the elevating layers have different widths, so that the contact area between each of the elevating layers and the corresponding spacer can be the same. With such structure, the contact area between each of the spacers and the corresponding elevating layer can be adjusted and be the same, thereby the problem of excessive or insufficient local brightness of the liquid crystal can be avoided.

5) In an embodiment according to one of 1) to 4) of the present disclosure, the first substrate is a color filter substrate and the second substrate is an array substrate. In a preferred embodiment, the elevating layers on the second substrate each comprise one or more selected from a group consisting of a protective film layer, a source layer and/or a drain layer, an amorphous silicon layer, an insulating film layer, and a gate layer, which are disposed in a stacked manner.

6) According to a second aspect of the present disclosure, a method for manufacturing a liquid crystal display is provided, comprising the steps of:

step 1: providing a second substrate and forming elevating layers thereon, the cross section of each of the elevating layers comprising a laterally extending portion and a longitudinally extending portion, step 2: forming spacers on the elevating layers, and step 3: assembling a first substrate on the second substrate, with the first substrate being in contact with the spacers.

7) In an embodiment according 6) of the present disclosure, the first substrate is a color filter substrate and the second substrate is an array substrate.

8) In an embodiment according 6) or 7) of the present disclosure, the elevating layers each have a cross-shaped cross section.

9) In an embodiment according to one of 6) to 8) of the present disclosure, the laterally extending portion and the longitudinally extending portion of the cross section of each elevating layer have different widths.

As compared with the prior art, the present disclosure has the following advantages. The cross section of each elevating layer has a laterally extending portion and a longitudinally extending portion. In this case, when displacement between the first substrate and the second substrate occurs, the spacers can still be kept on the elevating layers, and thus the problem of moving mura of the liquid crystal display can be avoided, thereby the display effect of the liquid crystal display can be improved and the yield thereof can be increased. In addition, the laterally extending portion and the longitudinally extending portion of the cross section of each of the elevating layers have different widths, so that the contact area between each of the spacers and the corresponding elevating layer can be the same. As a result, the problem of excessive or insufficient local brightness of the liquid crystal display can be avoided. The elevating layers each have a cross-shaped cross section, which is the simplest method for the cross section of each elevating layer to have a laterally extending portion and a longitudinally extending portion. In this case, the production cost of the liquid crystal display can be reduced.

BRIEF DESCRIPTION OF THE ACCOMPANYING DRAWINGS

Figure 3:
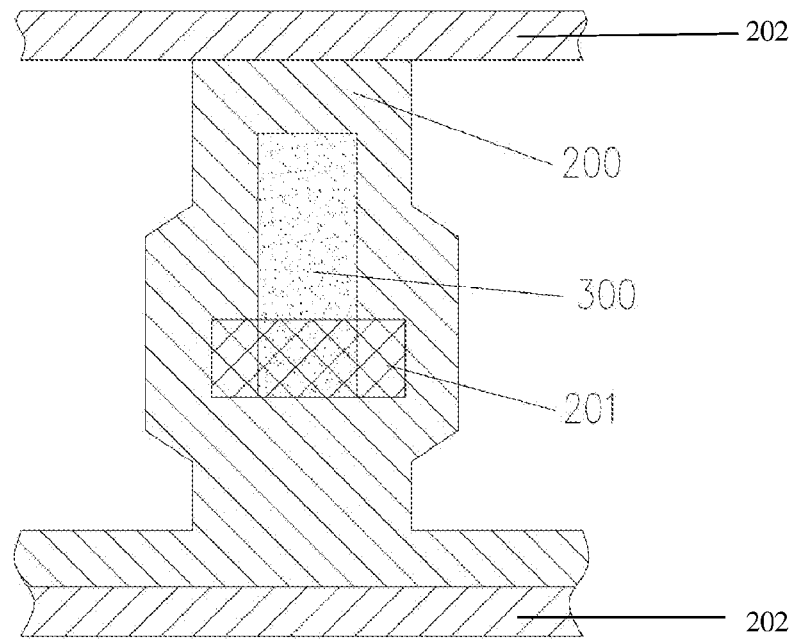
Figure 4:
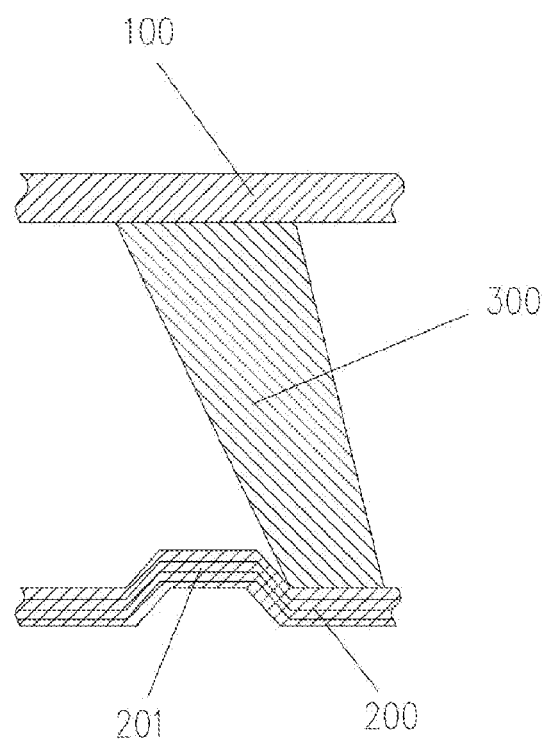
Figure 5:
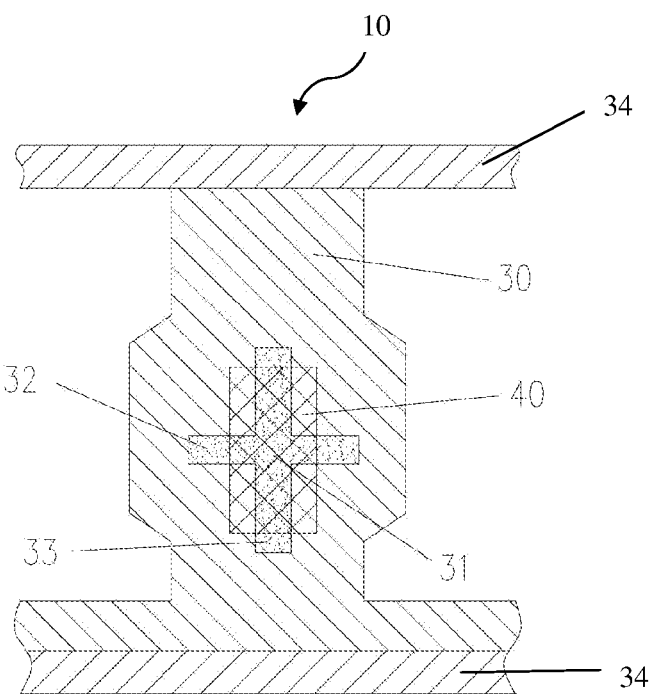
Figure 6:
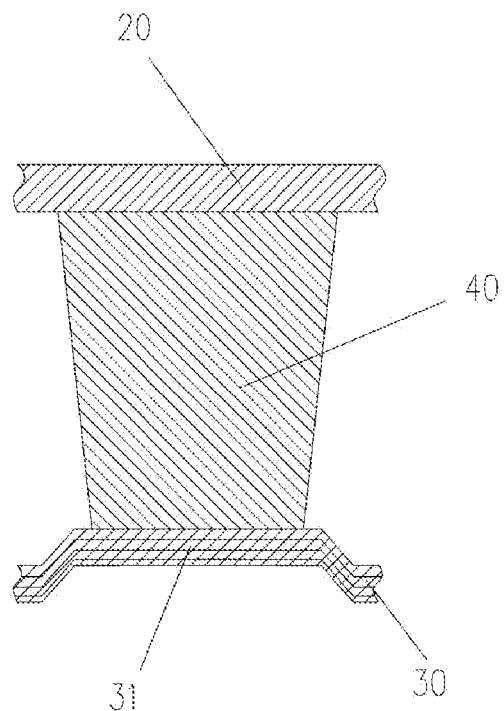
Figure 7:
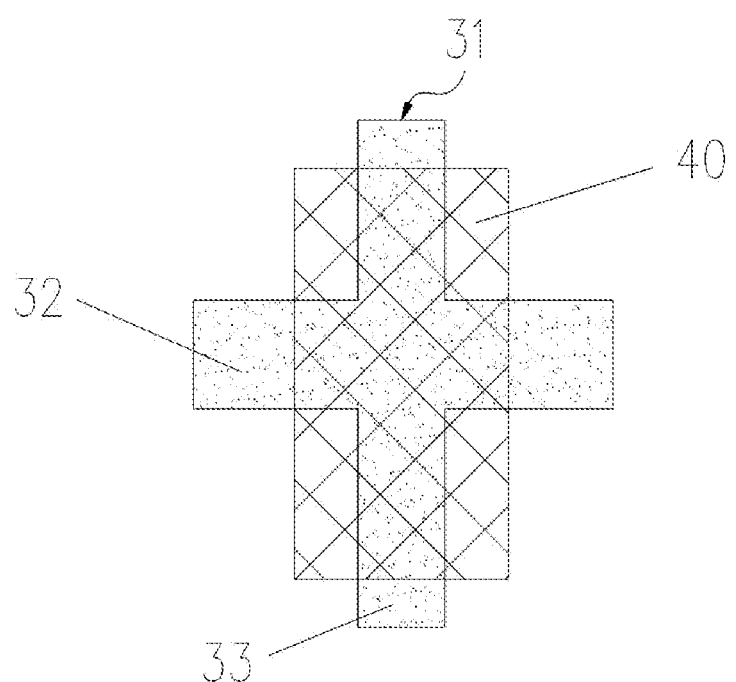

The present disclosure will be described in detail based on the accompanying drawings. In the drawings:

FIG. 1 schematically shows the positional relationship between an elevating layer and a spacer in the prior art, FIG. 2 shows a side view of FIG. 1, FIG. 3 schematically shows a displacement of the spacer in the prior art, FIG. 4 shows a side view of FIG. 3, FIG. 5 schematically shows the positional relationship between an elevating layer and a spacer according to example 1 of the present disclosure, FIG. 6 shows a side view of FIG. 5, and FIG. 7 schematically shows the positional relationship between an elevating layer and a spacer according to example 2 of the present disclosure.

In the accompanying drawings, the same components are indicated with the same reference sign. The drawings are not drawn to actual scale.

DETAILED DESCRIPTION OF THE EMBODIMENTS

The present disclosure will be further described in view of the accompanying drawings.

FIGS. 1 to 4 schematically shows the positional relationship between an elevating layer 201 and a spacer 300 in the prior art, which will not be described in detail herein.

FIGS. 5 and 6 schematically show part of an interior structure of a liquid crystal display 10 according to the present disclosure. As shown in FIG. 6, the liquid crystal display 10 comprises a first substrate 20 and a second substrate 30 that are spaced apart from each other. An elevating layer 31 is disposed on the second substrate 30. A spacer 40 in contact with the first substrate 20 is disposed on the elevating layers 31, so as to support both of the first substrate 20 and the second substrate 30 and to keep a space therebetween. In an example, the first substrate 20 is a color filter substrate and the second substrate 30 is an array substrate. Liquid crystal material (not shown) is filled in the space between the first substrate 20 and the second substrate 30, so as to display images. The elevating layer 31 on the second substrate 30 comprises one or more selected from a group consisting of a protective film layer, a source layer and/or a drain layer, an amorphous silicon layer, an insulating film layer, and a gate layer, which are disposed in a stacked manner. The layer structure is well known to one skilled in the art, and thus will not be described in detail. Reference number 34 indicates a gate line in the array substrate 30.

The elevating layer 31 is preferably structured with a cross section thereof including a laterally extending portion 32 and a longitudinally extending portion 33, as shown in FIG. 5. Preferably, the elevating layer 31 is structured to have a cross-shaped cross section. The spacer 40 is arranged to be in contact with both the laterally extending portion 32 and the longitudinally extending portion 33 of the elevating layer 31. In this case, when displacement between the first substrate 20 and the second substrate 30 occurs, due to the relatively long extending portions of the cross-shaped elevating layers 31 in both lateral and longitudinal directions, the spacer 40 can still be kept on the elevating layers 31 even when being moved. As a result, it is easy for the spacer 40 to return to its initial position, thereby the probability of moving mura on the liquid crystal display 10 can be reduced. It should be noted that although the elevating layer 31 is embodied as a cross shape in this example, it can also be structured as any other suitable shape, as long as the elevating layer 31 comprises extending portions in different directions.

Preferably, the laterally extending portion 32 and the longitudinally extending portion 33 of the elevating layer 31 with a cross-shaped cross section have different widths. FIG. 7 schematically shows that the width of the laterally extending portion 32 is larger than that of the longitudinally extending portion 33. It should be understood that the width of the longitudinally extending portion 33 can be configured larger than that of the laterally extending portion 32 instead. In this case, the spacer 40 should still be in contact with both the laterally extending portion 32 and the longitudinally extending portion 33. Because the width of the laterally extending portion 32 is different from that of the longitudinally extending portion 33, the contact area between the spacer 40 and the elevating layer 31 can be adjusted, and finally the contact area between a spacer 40 and a corresponding elevating layer 31 can be the same as that between another spacer 40 and another corresponding elevating layer 31. As a result, the problem of excessive or insufficient local brightness during the usage of the liquid crystal display 10 can be avoided, and the yield of the liquid crystal display 10 can be increased.

The present disclosure further relates to a method for manufacturing the liquid crystal display 10 as shown in FIGS. 5 to 7, comprising the following steps.

In step 1, a second substrate 30, on which elevating layers 31 are formed, is provided. The elevating layers 31 each are structured with a cross section including a laterally extending portion 32 and a longitudinally extending portion 33.

In step 2, a spacer 40 is arranged on a corresponding elevating layer 31.

In step 3, the first substrate 20 is assembled on the second substrate 30, and in contact with the spacer 40.

The first substrate 20 is preferably a color filter substrate, and the second substrate 30 is preferably an array substrate.

The elevating layers 31 each are preferably structured to have a cross-shaped cross section. More preferably, the laterally extending portion 32 and the longitudinally extending portion 33 of the cross section of each elevating layer 31 have different widths, so that the contact area between each of the spacers 40 with the corresponding elevating layer 31 can be the same.

Although the present disclosure has been described with reference to preferred embodiments, various modifications and variants to the present disclosure may be made by anyone skilled in the art, without departing from the scope and spirit of the present disclosure. In particular, as long as there is no structural conflict, various embodiments as well as the respective technical features mentioned herein may be combined with one another in any manner. The present disclosure is not limited to the specific examples disclosed herein, but rather includes all the technical solutions falling within the scope of the claims.

The invention claimed is:

1. A liquid crystal display, comprising:
a first substrate and a second substrate that are spaced apart from each other, and
spacers disposed between the first substrate and the second substrate and in contact with the first substrate and the second substrate,
wherein elevating layers are disposed on the second substrate and in contact with the spacers, and each of the elevating layers is structured with a cross section including a laterally extending portion and a longitudinally extending portion, and
the elevating layers each have a cross-shaped cross section, wherein the spacers each are in contact with both the laterally extending portion and the longitudinally extending portion of the cross section of the corresponding elevating layer, and
wherein the laterally extending portion and the longitudinally extending portion of the cross section of each elevating layer have different widths, so that the contact area between each of the spacers and the corresponding elevating layer is the same.

2. The liquid crystal display according to claim 1, wherein the first substrate is a color filter substrate and the second substrate is an array substrate.

3. The liquid crystal display according to claim 2, wherein the elevating layers on the second substrate each comprise one or more selected from a group consisting of a protective film layer, a source layer and/or a drain layer, an amorphous silicon layer, an insulating film layer, and a gate layer, which are disposed in a stacked manner.

4. A method for manufacturing a liquid crystal display, wherein
the liquid crystal display comprises a first substrate and a second substrate that are spaced apart from each other, and spacers disposed between the first substrate and the second substrate and in contact with the first substrate and the second substrate, wherein elevating layers are disposed on the second substrate and in contact with the spacers, and each of the elevating layers is structured with a cross section including a laterally extending portion and a longitudinally extending portion, and
the method comprises the steps of:
step 1: providing a second substrate and forming elevating layers thereon, the cross section of each of the elevating layer comprising a laterally extending portion and a longitudinally extending portion,
step 2: forming spacers on the elevating layers, and
step 3: assembling a first substrate on the second substrate, with the first substrate being in contact with the spacers, and
wherein the elevating layers each have a cross-shaped cross section, and
wherein the laterally extending portion and the longitudinally extending portion of the cross section of each elevating layer have different widths, so that the contact area between each of the spacers and a corresponding elevating layer is the same.

5. The method according to claim 4, wherein the first substrate is a color filter substrate and the second substrate is an array substrate.

* * * * *